US012765713B2

(12) United States Patent
Dong et al.

(10) Patent No.: US 12,765,713 B2
(45) Date of Patent: Oct. 20, 2026

(54) COATINGLESS NON-STICK PAN

(71) Applicant: TIBET SUNTRUE HOUSEWARE TECH CO., LTD., Tibet (CN)

(72) Inventors: Xuelu Dong, Tibet (CN); Xucai Tu, Tibet (CN)

(73) Assignee: TIBET SUNTRUE HOUSEWARE TECH CO., LTD., Tibet (CN)

( * ) Notice: Subject to any disclaimer, the term of this patent is extended or adjusted under 35 U.S.C. 154(b) by 157 days.

(21) Appl. No.: 18/848,067

(22) PCT Filed: Dec. 8, 2023

(86) PCT No.: PCT/CN2023/137456
§ 371 (c)(1),
(2) Date: Sep. 17, 2024

(87) PCT Pub. No.: WO2025/055162
PCT Pub. Date: Mar. 20, 2025

(65) Prior Publication Data

US 2026/0174280 A1 Jun. 25, 2026

(30) Foreign Application Priority Data

Sep. 12, 2023 (CN) ......................... 202322500191.5

(51) Int. Cl.
*A47J 36/02* (2006.01)
*A47J 27/00* (2006.01)

(52) U.S. Cl.
CPC ........... *A47J 36/025* (2013.01); *A47J 27/002* (2013.01)

(58) Field of Classification Search
CPC .......... A47J 36/025; A47J 36/02; A47J 36/00; A47J 36/022; A47J 27/002;

(Continued)

(56) References Cited

U.S. PATENT DOCUMENTS 3,211,325 A * 10/1965 Wisnicki ................... C23C 4/18 159/DIG. 13
3,271,653 A * 9/1966 Wolf ......................... C23C 4/08 220/573.2

(Continued)

FOREIGN PATENT DOCUMENTS

CN 203106763 U 8/2013
CN 203263007 11/2013

(Continued)

OTHER PUBLICATIONS

International Search Report; GZW023P10018; Dec. 8, 2023.

*Primary Examiner* — Prince Pal
(74) *Attorney, Agent, or Firm* — EVERSHEDS SUTHERLAND (US) LLP

(57) ABSTRACT

The present application discloses a coatingless non-stick pan and relates to the field of non-stick pans. The coatingless non-stick pan comprises a pan body, wherein a side of the pan body facing away from a heat source upon operation is formed with a plurality of protrusions, and the side of the pan body facing away from the heat source upon operation is formed with a plurality of blind holes obtained by photo etching, a depth of the blind holes is less than 400 microns, a diameter of the blind holes is less than 300 microns, a protruding height of the protrusions is less than 500 microns, and a distance of the blind holes from the protrusions closest thereto is less than 50,000 microns. In the present application, the protrusions are disposed on a working surface so that the protrusions may also form holes with a larger diameter than that of the blind holes, so that hot air is generated between the protrusions. The blind holes may contain edible oil, and even in the absence of oil, hot air is generated in the blind holes. During the cooking process, the protrusions and the blind holes may cooperate with one another to generate oil vapor or hot air to hold the food up (Continued)

so that a frictional force of the food on an inner surface of the pan body is greatly reduced and the non-stick effect is better.

10 Claims, 7 Drawing Sheets

(58) Field of Classification Search
CPC ............... Y10S 220/912; B21D 51/225; B23P 2700/05; Y10T 29/49888; Y10T 29/49982; B65D 1/40; B32B 15/043; B32B 15/04; B32B 15/00; B32B 1/00; B32B 3/12; B32B 1/10; C25D 11/026; C25D 11/02; C25D 11/26
USPC ............ 220/573.2, 573.1, 912, 62.17, 573.3, 220/62.13; 29/460, 527.2, 458; 427/230, 427/256, 505, 249.19, 255.32, 255.36
See application file for complete search history.

(56) References Cited

U.S. PATENT DOCUMENTS

| | | | | |
|---|---|---|---|---|
| 4,162,334 | A * | 7/1979 | Crandall | A47J 36/04 426/523 |
| 5,252,360 | A * | 10/1993 | Huttl | B41N 3/003 427/419.7 |
| 5,430,928 | A * | 7/1995 | Flammang | A47J 36/02 29/DIG. 37 |
| 5,506,062 | A * | 4/1996 | Flammang | A47J 36/02 428/614 |
| 5,628,426 | A * | 5/1997 | Doyle | A47J 27/022 99/425 |
| 6,092,520 | A * | 7/2000 | Hasegawa | A47J 27/022 220/573.1 |
| 6,248,435 | B1 * | 6/2001 | Leck | B05D 3/207 428/323 |
| 6,286,708 | B1 * | 9/2001 | Scheibmeir | A21B 3/13 220/573.1 |
| 7,571,530 | B2 * | 8/2009 | Park | A47J 36/025 220/573.1 |
| 8,070,116 | B1 * | 12/2011 | Malaspino | A47G 19/08 220/573.1 |
| 8,540,107 | B2 * | 9/2013 | Lee | A47J 36/025 220/573.1 |
| 10,244,882 | B2 * | 4/2019 | Lee | B05D 5/08 |
| 10,368,691 | B2 * | 8/2019 | Allemand | B23P 15/00 |
| 10,568,457 | B2 * | 2/2020 | Ferron | A47J 36/04 |
| 12,144,458 | B2 * | 11/2024 | Zhang | A47J 27/002 |
| 2001/0004056 | A1 * | 6/2001 | Sawyer | A21B 3/155 220/573.1 |
| 2008/0105689 | A1 * | 5/2008 | Ren | A47J 27/002 220/573.2 |
| 2008/0237241 | A1 * | 10/2008 | Buffard | A47J 36/025 220/573.2 |
| 2009/0127268 | A1 * | 5/2009 | Cuillery | C25D 11/08 220/573.1 |
| 2010/0001006 | A1 * | 1/2010 | Workens | A47J 36/02 220/573.2 |
| 2011/0027465 | A1 * | 2/2011 | Kil | C23C 16/40 427/80 |
| 2011/0180546 | A1 * | 7/2011 | Le Bris | A47J 36/025 427/454 |
| 2011/0192850 | A1 * | 8/2011 | Le Bris | A47J 36/025 220/573.2 |
| 2012/0018433 | A1 * | 1/2012 | Le Bris | G01K 11/12 428/209 |
| 2012/0048864 | A1 * | 3/2012 | Lin | A47J 37/0676 220/573.1 |
| 2012/0248123 | A1 * | 10/2012 | Rayudu | A47J 37/10 220/573.1 |
| 2012/0305568 | A1 * | 12/2012 | Lee | A47J 36/04 220/573.2 |
| 2014/0004311 | A1 * | 1/2014 | Alim | A47J 36/025 72/46 |
| 2014/0061205 | A1 * | 3/2014 | Chiu | A47J 36/025 220/573.2 |
| 2014/0154476 | A1 * | 6/2014 | Perillon | A47J 36/025 427/256 |
| 2015/0001226 | A1 * | 1/2015 | Groll | A47J 37/10 220/573.1 |
| 2015/0108143 | A1 * | 4/2015 | Groll | A47J 27/002 220/573.2 |
| 2015/0327708 | A1 * | 11/2015 | Park | A47J 27/022 220/573.1 |
| 2016/0113439 | A1 * | 4/2016 | Fu | A47J 36/025 220/573.2 |
| 2017/0303737 | A1 * | 10/2017 | Allemand | B21D 51/22 |
| 2018/0116447 | A1 * | 5/2018 | Orlando | B05D 3/0254 |
| 2023/0263335 | A1 * | 8/2023 | Cheng | A47J 36/025 220/573.2 |
| 2023/0270283 | A1 * | 8/2023 | Wang | A47J 27/002 220/573.2 |
| 2023/0309742 | A1 * | 10/2023 | Garcia | A47J 37/01 220/573.1 |
| 2024/0298835 | A1 * | 9/2024 | Wang | A47J 36/00 |
| 2025/0040751 | A1 * | 2/2025 | Dong | B32B 3/12 |
| 2025/0366656 | A1 * | 12/2025 | Corbani | A47J 36/02 |
| 2026/0013661 | A1 * | 1/2026 | Zhang | A47J 36/025 |

FOREIGN PATENT DOCUMENTS

| | | | |
|---|---|---|---|
| CN | 107495826 | A | 12/2017 |
| CN | 217959625 | U | 12/2022 |
| CN | 220141411 | U | 12/2023 |
| JP | 2008023255 | A | 2/2008 |
| KR | 101945631 | B1 | 2/2019 |

* cited by examiner

COATINGLESS NON-STICK PAN

TECHNICAL FIELD

The present application relates to the technical field of non-stick pans and specifically to a coatingless non-stick pan.

BACKGROUND

The types of conventional pan products mainly include aluminum pans, stainless steel pans, iron enamel pans, iron pans and non-stick pans. Among the pans, the heat distribution of the aluminum pan is excellent, the heat transfer effect is better than that of the stainless steel pan, and the pan body is lighter, but the aluminum pan is not easy to clean, and a large amount of oil smoke is caused when more oil is used. The stainless steel pan has a poor heat distribution and tends to produce heat-gathering spots and burn food. The iron enamel pan has a poor heat distribution, and the food is prone to stick on the bottom of the pan, the pan is not easy to clean, and the surface is prone to damages. The iron pan has a poor heat distribution, and is prone to produce heat-gathering spots and burn food. The non-stick pan may overcome the shortcomings of the above-mentioned pans, and the non-stick pan is easy to clean without food being stuck on the bottom of the pan, and can minimize the use of oil and reduce oil smoke.

SUMMARY

Technical Problem

Conventional non-stick pans have a poor wear resistance, and the non-stick performance thereof will degrade or even fail after being used in a period of time. How to enhance the wear resistance of non-stick pans has become an urgent problem to be solved in the field of non-stick pans.

Technical Solution

The present application aims to solve one of the technical problems in the related art to a certain extent. To this end, the present application provides a coatingless non-stick pan with the advantages of a good non-stick effect and a long duration of the non-stick effect.

In order to achieve the above object, the present application employs the following technical solutions.

A coatingless non-stick pan comprises a pan body, wherein a side of the pan body facing away from a heat source upon operation is formed with a plurality of protrusions, and the side of the pan body facing away from the heat source upon operation is formed with a plurality of blind holes obtained by photo etching, a depth of the blind holes is less than 400 microns, a diameter of the blind holes is less than 300 microns, a protruding height of the protrusions is less than 500 microns, and a distance of the blind holes from the protrusions closest thereto is less than 50,000 microns.

Optionally, the depth of the blind holes is in a range between 1 and 400 microns, and the diameter of the blind holes is less than 100 microns.

Optionally, the plurality of protrusions are radially distributed on a working surface of the pan body.

Optionally, the plurality of protrusions are circumferentially distributed on the working surface of the pan body in multiple layers.

Optionally, the protrusions have a protruding height in a range between 20 and 500 microns.

Optionally, the protrusions are ribs having a wire diameter in a range between 100 and 500 microns.

Optionally, the protrusions are a plurality of bosses which are arranged continuously.

Optionally, the blind holes are disposed in the protrusions.

Optionally, a ratio of an upper area of the protrusions to a cross-sectional area of the blind holes is in a range between 0.5 and 1.

Optionally, the pan body is made of titanium, stainless steel, iron, aluminum, aluminum alloy or magnesium.

The features and advantages of the present application will be disclosed in detail in the following detailed description and the accompanying drawings. The best implementations or means of the present application will be shown in detail with reference to the accompanying drawings, but are not intended to limit the technical solutions of the present application. In addition, the features, elements and components that appear in the following text and drawings are multiple and marked with different symbols or numbers for convenience of depictions, but all represent members having the same or similar constructions or functions.

Beneficial Effects

The present application has the following advantageous effects: the protrusions are disposed on a working surface so that the protrusions may also form holes with a larger diameter than that of the blind holes, as such, hot air is generated between the protrusions. The blind holes may contain edible oil, and even in the absence of oil, hot air is generated in the blind holes. Therefore, during the cooking process, the protrusions and the blind holes may cooperate with one another to generate oil vapor or hot air to hold the food up to realize non-sticking, so that a frictional force of the food on an inner surface of the pan body is greatly reduced and the non-stick effect is better. Meanwhile, when the non-stick pan is used, the spatula cannot directly touch the blind holes due to the presence of the protrusions, and thus the blind holes are not easily worn under the protection of the protrusions. The duration of the non-stick effect of the non-stick pan may be longer due to the protection of the blind holes by the protrusions. In addition, the non-stick pan does not use a chemical coating, can resist high-temperature dry burning, does not generate toxic and harmful substances, has no harm to human body and is safer.

BRIEF DESCRIPTION OF THE DRAWINGS

The present application is further described below with reference to the following figures.

Figure 1:
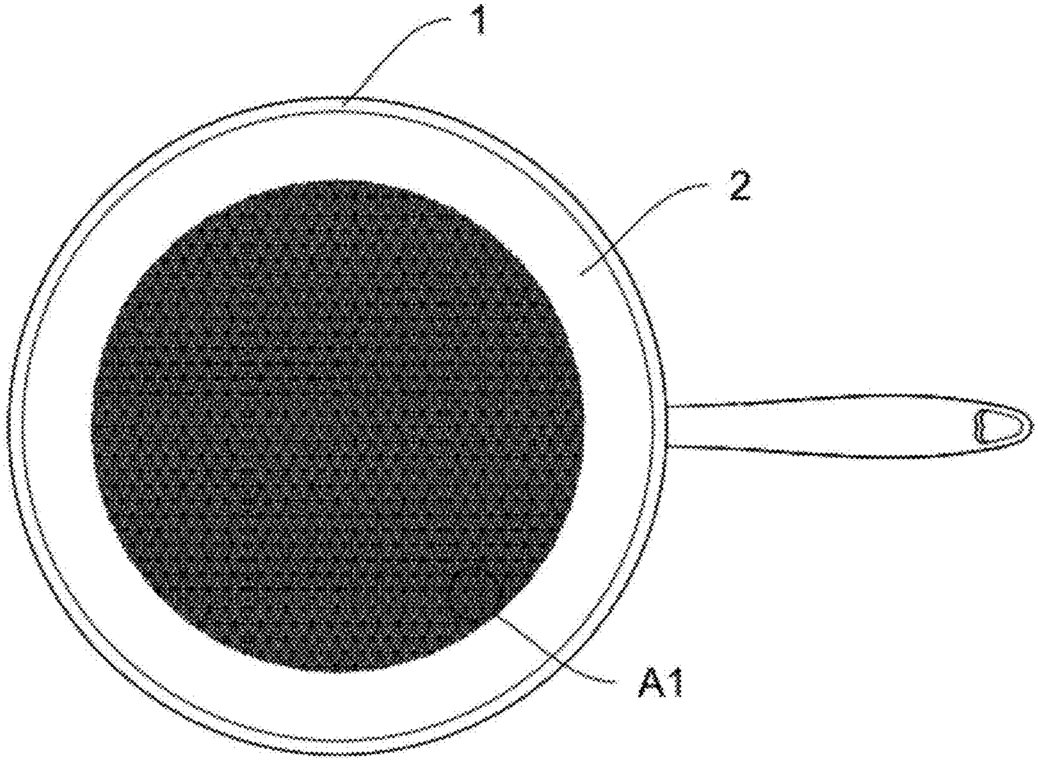
FIG. 1 is a top view of an implementation of a coating-less non-stick pan according to an embodiment of the present application.

Wherein 1. pan body; 2. working surface; 3. rib; 4. blind hole; 5. food.

EMBODIMENTS OF THE INVENTION

Reference will now be made in detail to the embodiments of the present application. Examples of the embodiments are shown in the figures, wherein like or similar reference numerals denote the same or similar elements or elements having the same or similar functions throughout the specification. The embodiments in the implementations are intended to illustrate the present application and cannot be construed as limiting the present application.

Reference in the specification to "one embodiment" or "an instance" or "an example" means that a specific feature, structure or characteristic described with reference to the embodiment itself may be included in at least one embodiment of the patent disclosure. The appearances of the phrase "in one embodiment" in various places in the specification are not necessarily all referring to the same embodiment.

EMBODIMENTS

Reference is mainly made to the non-stick performance test of fried eggs for the evaluation on the non-stick effect of the pans. In the absence of Leidenfrost effect, a plastic spatula may be used to take the fried eggs out of the pan without damages and without leaving any residue, which is evaluated as Level 1; the fried eggs cannot be taken out of the pan with the plastic spatula without any damages, and instead the residue can be removed by gently wiping with a wiping sponge or gauze, which is evaluated as Level 2. As for an ordinary iron pan, without the influence from the Leidenfrost effect, a lot of oil needs to be added to prevent eggs from being stuck on the pan. The non-stick pans may achieve the non-stick effect in the event of no occurrence of the Leidenfrost effect.

The non-stick effect of the pan is achieved mainly by improving the hydrophobic performance and oil-repellent performance of the pan surface. A liquid droplet assumes different forms when it exists stably on a solid surface, and the forms are represented by a contact angle (CA). The contact angle refers to a tangent of a gas-liquid interface at an intersection of three phases, namely, solid phase, liquid phase and gaseous phase. As for the tangent, an angle between the side of the liquid and the solid-liquid boundary line is A. The value of A is in a range between 0 degree and 180 degrees. A critical contact angle value of hydrophilicity and hydrophobicity is 90 degrees. An angle greater than 90 degrees is defined as hydrophobic. The larger the contact angle is, the better the hydrophobicity of the surface is. Super-hydrophobicity refers to a moist state with the contact angle being greater than 150 degrees. That is to say, a static-state liquid droplet tends to remain spherical on the surface. Furthermore, an angle characterizing a rolling angle of a dynamic wettability is needed to be less than 10 degrees to obtain the effect of super-hydrophobicity. In the current research, this property is achieved primarily by a combination of a surface micro-nano composite structure and a low-surface energy material. A typical low-surface energy material is Teflon. The super-hydrophobicity of the surface micro-nano composite structure extremely depends on the integrity of the micro-nano composite structure, and even a slight abrasion of the surface micro-nano composite structure will cause a great decrease of hydrophobicity. Therefore, the non-stick pans using lotus microstructures have a relative poor wear resistance, and like ceramic non-stick pans, which are safe but cannot be used for a long time.

There are two ways to obtain a good hydrophobic effect: one by adding a chemical coating on the pan and the other by using a nano-lotus effect.

Non-stick pan products using chemical coatings mainly include ceramic non-stick pans, Teflon non-stick pans and honeycomb non-stick pans. Among them, the ceramic non-stick pans mean that a ceramic coating is applied on an inner surface of the metal pan in contact with the food, so as to achieve a non-stick use effect. The ceramic coating is typically made by a Sol-Gel process using an inorganic mineral containing silicon and oxygen. The ceramic non-stick coating can withstand a high temperatures up to 450° C. without generating any harmful smoke even at a temperature above 450° C. and is therefore safe. However, the ceramic non-stick coating has a poor ductility, high brittleness, tendency to cracks and wear quickly. This leads to a poor wear resistance of the ceramic non-stick pans, a shorter duration of the non-stick effect and a poor use experience. If Teflon is added to improve the performance of the ceramic non-stick coating, its advantage of high temperature resistance will be weakened, and the safety of the composite material coating is not fully tested.

The Teflon non-stick pans mean that a Teflon material coating is applied on an inner surface of the metal pan in contact with the food, so as to achieve the non-stick use effect. The Teflon material has an excellent performance, is resistant to acids and bases, is resistant to various organic solvents, is almost insoluble in all solvents, is resistant to high temperature, and has a very low coefficient of friction. A polytetrafluoro ethylene (PTFE) non-stick coating, which is mainly used in the field of non-stick pans, can be used continuously at 260° C., with a use temperature of up to 290-300° C. The super-hydrophobic effect can be achieved on the working surface of the pan body by using PTFE, and the better non-stick performance can be obtained. However, the Teflon non-stick pans are not scratch resistant and cannot be dry fired at a high temperature. Furthermore, when perfluorooctanoic acid (PFOA) is used in the manufacture of Teflon, it might cause pollution in the surrounding areas of production environment, thus causing great harm to human body. Even though GenX is used as an alternative to perfluorooctanoic acid, its safety has not been clearly validated.

In order to overcome the shortcoming of non-scratch resistance of the Teflon non-stick pan, there is provided a honeycomb non-stick pan, wherein a Teflon material coating is applied on an inner surface layer of the metal pan in contact with the food, and concave and convex textures are etched in the pan wall by an etching process, and the convex portion constitutes an uncoated honeycomb mesh structure, which can isolate the food from the non-stick layer, to solve the problem that the coating of the Teflon coating non-stick pan is apt to fall off. However, during an actual use, due to the existence of the honeycomb mesh surface structure, with the increase of the number of use, the honeycomb mesh surface structure is prone to hide dirt and is not easy to be cleaned, and if it is excessively cleaned, the Teflon coating might be damaged, thereby causing the sticking of food to the pan. Further, since the thermal expansion coefficients of the Teflon coating and the honeycomb mesh surface structure are different, this might cause the coating in the small holes in the honeycomb mesh prone to loosen or fall off.

Since many people have a certain psychological resistance to non-stick pans using a chemical coating and the manufacturing process of Teflon non-stick pans is not clean and environmentally friendly, there is also a class of non-stick pans using a physical non-stick design. Its inspiration comes from the lotus structure, and utilizes the nano lotus effect. Such a non-stick pan uses a mechanical method to machine the surface of the pan into an uneven surface to increase the surface area. This design is derived from the fact that the surface of lotus leaves is observed under a microscope as having many convex and concave structures, which makes it more hydrophobic and finally forms the super-hydrophobic surface.

Figure 2:
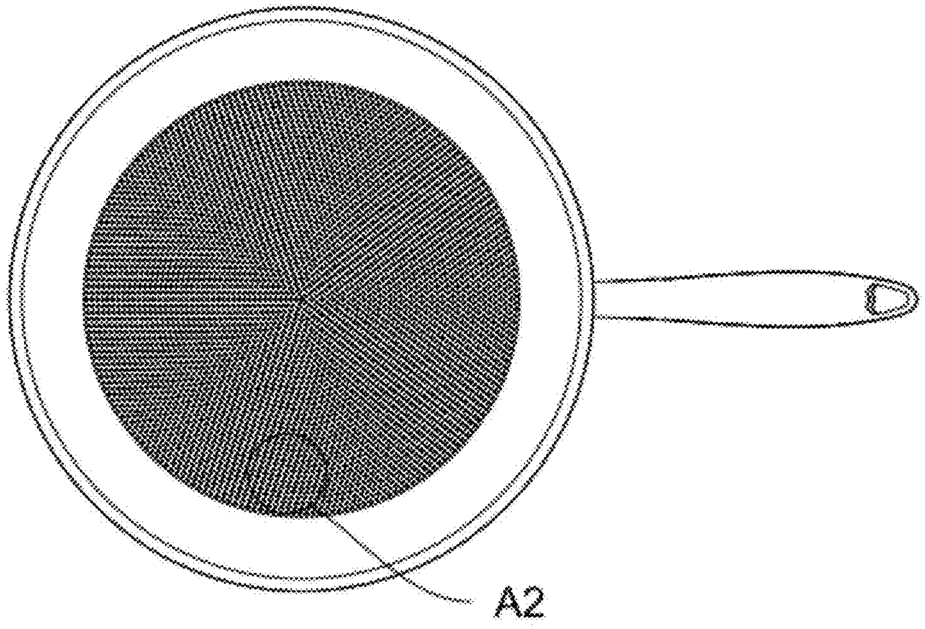
FIG. 2 is a top view of another implementation of a coating-less non-stick pan according to an embodiment of the present application.
Figure 3:
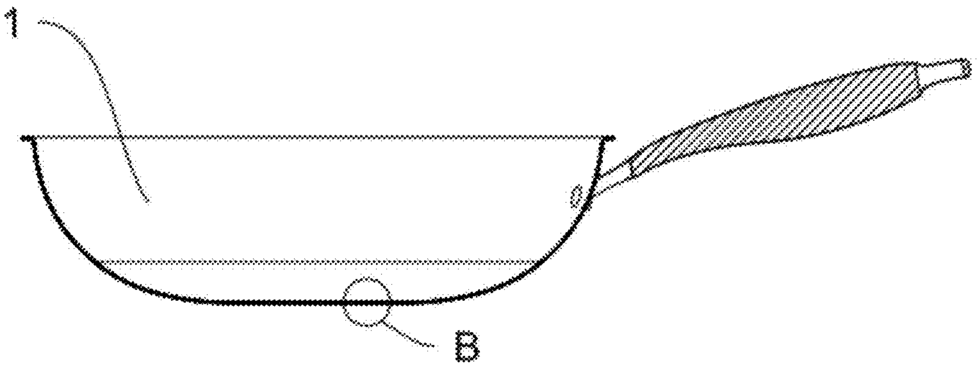
FIG. 3 is a side view of a coating-less non-stick pan according to an embodiment of the present application.

In order to overcome the problem of a poor wear resistance of the lotus microstructure of the non-stick pan using the nano lotus effect as described above, as shown in FIG. 1, FIG. 2 and FIG. 3, a coatingless non-stick pan is provided in the present embodiment. The coatingless non-stick pan comprises a pan body 1, wherein a side of the pan body 1 facing away from a heat source upon operation is formed with a plurality of protrusions 3, and the side of the pan body 1 facing away from the heat source upon operation is formed with a plurality of blind holes 4 obtained by photo etching, wherein a depth of the blind holes 4 is less than 400 microns, a diameter of the blind holes 4 is less than 300 microns, a protruding height of the protrusions 3 is less than 500 microns, and a distance of the blind holes 4 from the protrusions 3 closest thereto is less than 50,000 microns.

In the present application, a specific mode of using the coatingless non-sticking pan is not limited, and the coatingless non-stick pan may be a boiling pan, a stir-frying pan, a frying pan, etc.

In the present application, the material of the pan body of the coatingless non-sticking pan is not limited, and the pan body may be an aluminum pan body, a titanium pan body, a magnesium pan body, an iron pan body and a stainless steel pan body. In alternative embodiments, the pan body may be a composite material pan body, for example, it may be an aluminum steel pan body, an aluminum titanium pan body, an iron titanium pan body, etc.

In the present application, the material of the pan body on the side of the coatingless non-stick pan facing away from the heat source is not limited, and the material may be aluminum, magnesium or titanium. As an alternative, the pan may be an iron pan with iron as a base, and the side on which the food is contained during operation may be provided with a titanium layer. The pan may also be an aluminum pan with aluminum as a base, and the side on which the food is contained during operation may be provided with a magnesium layer.

In the present application, the structure of the pan body of the coatingless non-stick pan is not limited, and the pan body may be a single-layer structure pan body or a composite structure pan body. In an alternative embodiment, the pan body 1 is a composite structure pan body, wherein the pan body 1 comprises a plurality of sub-pan bodies, and the plurality of sub-pan bodies are stacked in a thickness direction, namely, the pan body may be a double-layered structure or a multi-layered composite structure.

In the present application, the specific structure of the side of the pan body for containing the food during operation is not limited. As an alternative, a working surface 2 of the pan body may be provided with a raised pattern consisting of a plurality of ribs having a relative height difference in a range between 200 microns and 1000 microns with respect to the working surface 2 of the pan body 1. The ribs are disposed on the working surface 2, and a plurality of micro-scale blind holes 4 are also distributed in the working surface 2. The blind holes 4 are obtained by etching with light energy, not by oxidation treatment, sandblasting or mechanical grinding.

If the working surface 2 of the pan body 1 is subjected to oxidation treatment and sandblasting, the relative height difference between the ribs 3 and the working surface 2 cannot be ensured, because a thickness of an oxide layer cannot be precisely controlled when the oxidation treatment and sandblasting are performed; meanwhile, the height difference between the ribs 3 and the working surface 2 is relatively small, which will cause the oxide layer to "smooth" the height difference between the ribs and the working surface of the pan body, so that the raised pattern on the working surface disappears. Alternatively, there is a case where the ribs in a partial area are relatively high and the ribs in a partial area are relatively low, thereby affecting the use of the pan.

In an alternative embodiment, the protrusions 3 may also be a plurality of bosses, as shown in FIG. 5, FIG. 6, FIG. 7, FIG. 11 and FIG. 12. In the present application, the specific structure and form of the bosses are not limited, and in an alternative embodiment, the bosses may be connected to one another. The bosses may also be arranged independently of one another. The angle of inclination of the sides of the bosses may be less than 90 degrees or may be greater than 90 degrees. The angle of inclination of the sides of the bosses may also be 90 degrees. In the present application, the size of the bosses is not limited. The larger the bosses are, the better protection is provided for the blind holes 4 on the working surface 2.

Figure 5:
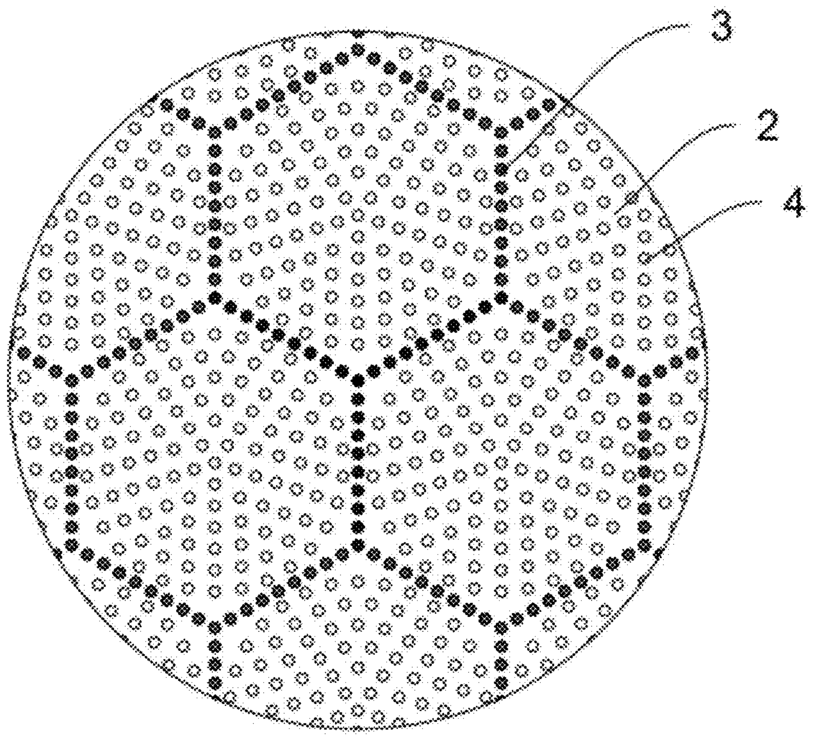
FIG. 5 is a first enlarged view of a portion A2 in FIG. 2.
Figure 6:
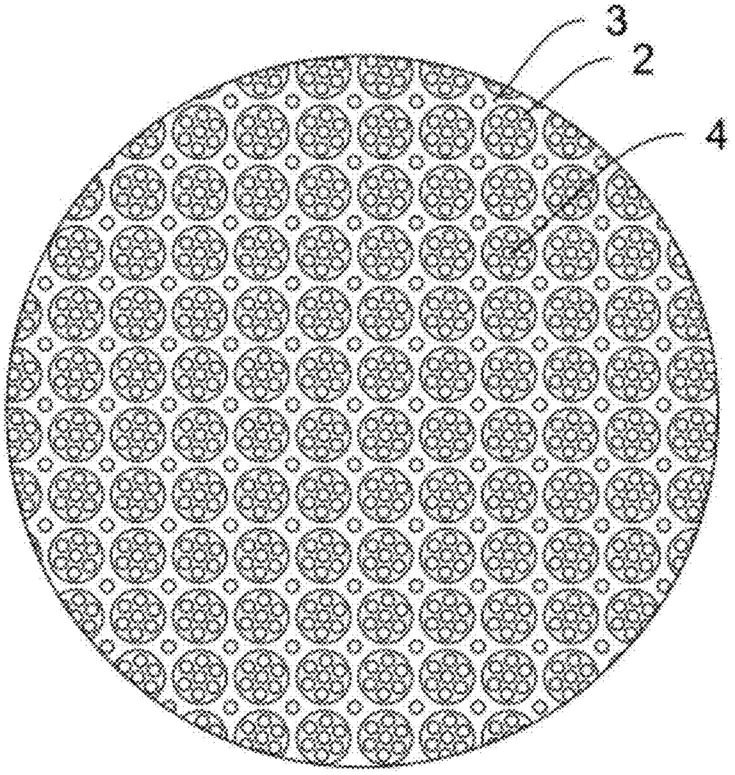
FIG. 6 is a second enlarged view of the portion A2 in FIG. 2.
Figure 7:
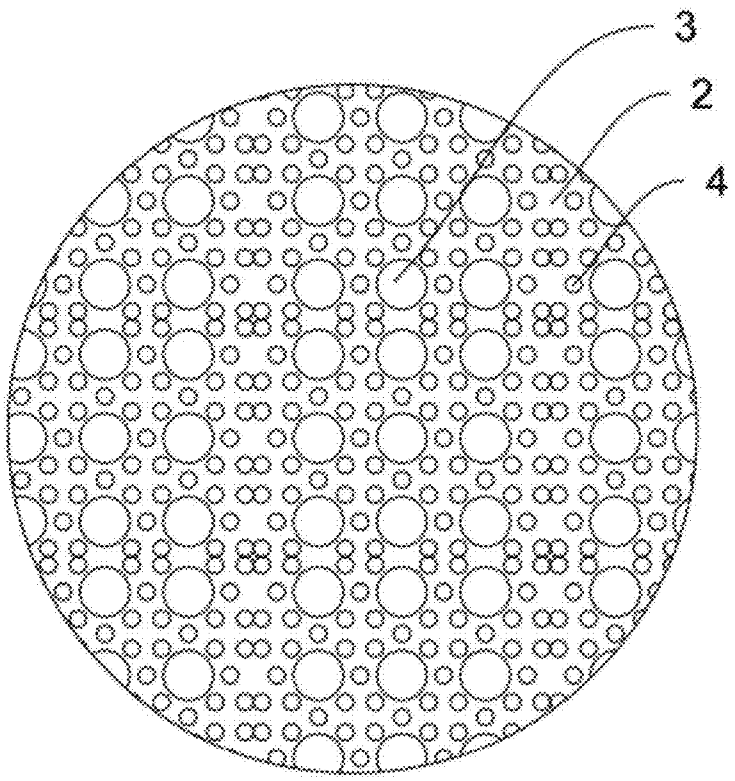
FIG. 7 is a third enlarged view of the portion A2 in FIG. 2.
Figure 8:
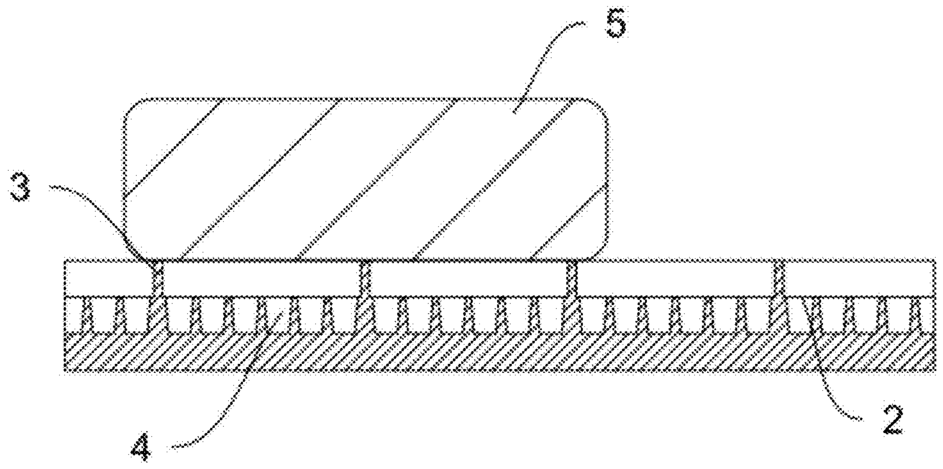
FIG. 8 is a first enlarged view of a portion B in FIG. 3.
Figure 9:
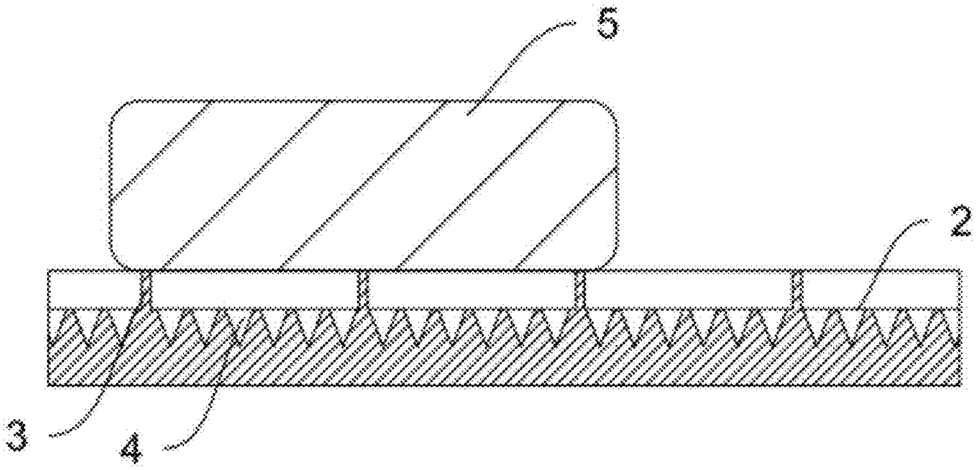
FIG. 9 is a second enlarged view of the portion B in FIG. 3.
Figure 10:
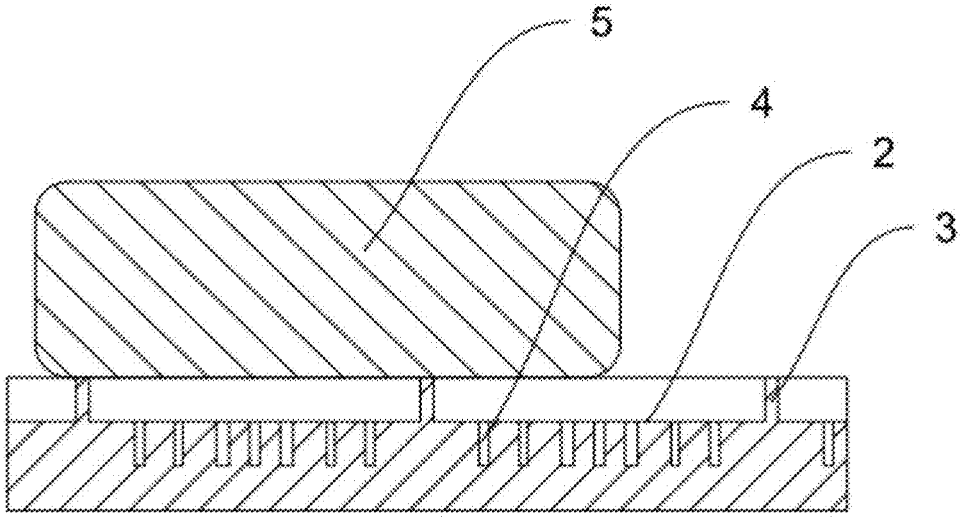
FIG. 10 is a third enlarged view of the portion B in FIG. 3.
Figure 11:
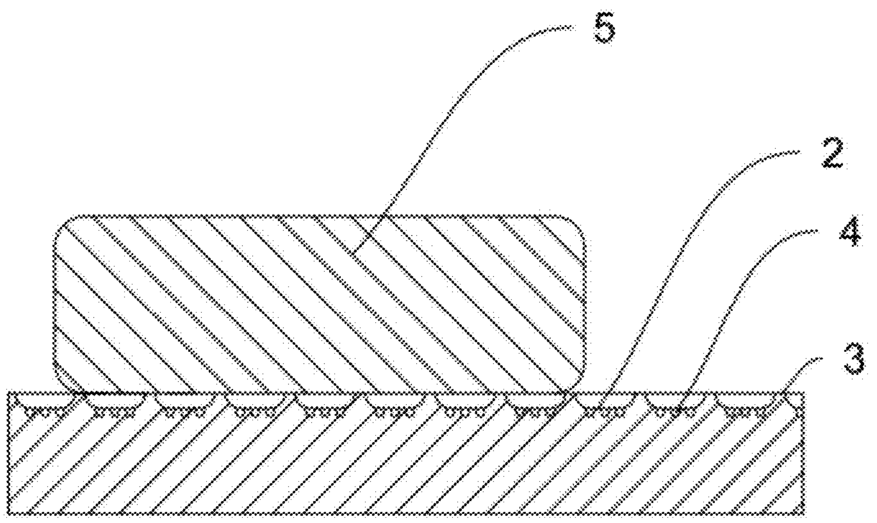
FIG. 11 is a fourth enlarged view of the portion B in FIG. 3.
Figure 12:
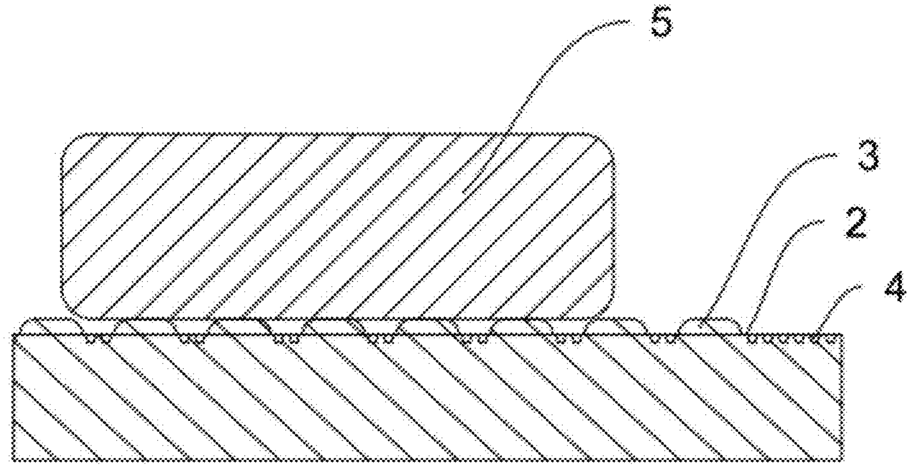
FIG. 12 is a fifth enlarged view of the portion B of FIG. 3.

In the present application, the manner of arranging the bosses is not limited. As shown in FIG. 5, FIG. 6 and FIG. 7, in an alternative embodiment, the bosses may be arranged in a honeycomb shape or a circular shape. The bosses may also be arranged continuously, so that the working surface 2 will form recesses with respect to the bosses, and blind holes are disposed in the recesses formed with respect to the bosses.

Figure 4:
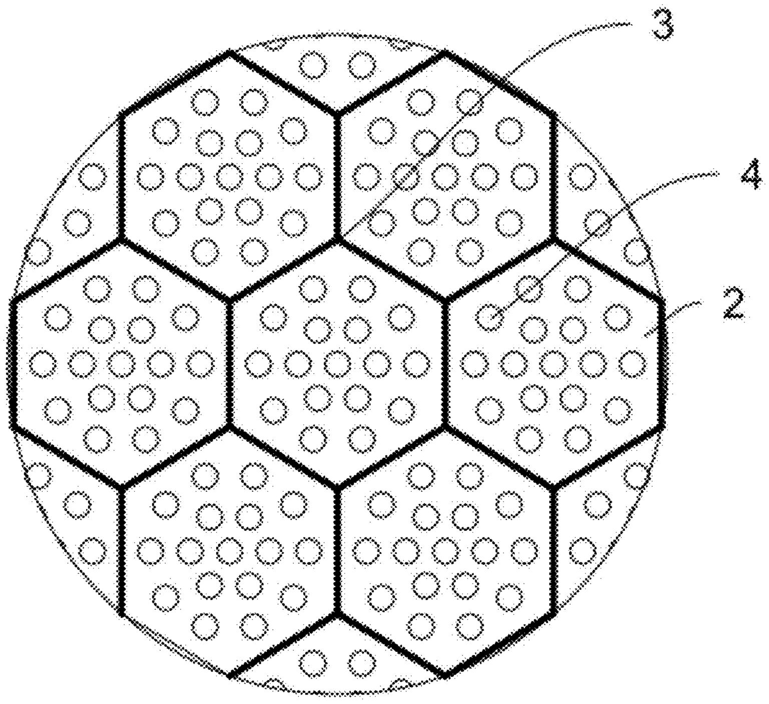
FIG. 4 is an enlarged view of a portion A1 in FIG. 1.

In the present application, the manner of arranging the ribs is not limited. As shown in FIG. 4, in an alternative embodiment, the ribs may be combined together to form a pattern. The pattern may be square, diamond, scale-shaped, fan-shaped or honeycomb-shaped. The pattern may also be a non-continuous linear pattern.

In the present application, the size of the ribs is not limited. In an alternative embodiment, an individual rib has a wire diameter in a range between 100 and 500 microns, and a height in a range less than 500 microns. Further, in preferred embodiments, the protruding height of the ribs is in a range between 20 and 500 microns.

In the present application, the manner of arranging the blind holes is not limited. In alternative embodiments, the blind holes may be arranged in arrays. The blind holes may be radially distributed, or may be circumferentially distributed in multiple layers. The blind holes 4 may be continuous holes or discrete holes. A bore diameter of the blind holes 4 may vary in a vertical direction, may become smaller in an up-to-down direction or become larger in the up-to-down direction, or may also be consistent up-to-down. In the present application, a shape of the blind holes is not limited, and the blind holes may be circular holes or square holes.

In the present application, a size of the blind holes is not limited, and in an alternative embodiment, a depth of the blind holes 4 is in a range between 1 and 200 microns and a diameter of the blind holes 4 is less than 100 microns.

When the working surface 2 is machined, the protrusions 3 are already present on the working surface 2. However, the protrusions 3 needn't be considered in the process of dividing the working surface 2 into numerous holes. Therefore, when photo-etching is performed, the etching is also performed on the protrusions 3, and blind holes 4 are also formed on the protrusions 3. It will be appreciated that the protrusions 3 are integral with the working surface 2 and that the protrusions 3 are part of the working surface 2.

As shown in FIG. 8, FIG. 9, FIG. 10, FIG. 11 and FIG. 12, when the coatingless non-stick pan is used, the pan body 1 needs to be heated, so that the temperature of the pan body 1 rises; after the temperature rises, the air in the blind holes 4 will expand to hold the food 5 up to achieve the non-stick effect. Furthermore, since the protrusions 3 protrude relative to the working surface, the working surface 2 also form relative recesses with respect to the protrusions 3. These relative recesses enable the working surface to generate hot air, which may hold the food 5 up. As such, the hot air in the recesses and the hot air in the blind holes are combined with each other, so that the non-stick effect is made better.

Sometimes the pan body may use a material with a lower hardness, which makes the blind holes easily deformed and causes blockage. Further, since the blind holes 4 are very small, they have a poor wear resistance. In this case, the blind holes 4 on the protrusions 3 may wear out during use. However, the blind holes 4 on the working surface 2 will not wear out because the spatula does not directly come into frictional contact with the blind holes 4 due to the blocking of the protrusions 3. In this way, the coatingless non-stick pan of the present embodiment utilizes the protrusions 3, so that the blind holes 4 on the working surface 2 of the non-stick pan are not in direct contact with items such as the spatula when the non-stick pan is in use, the blind holes 4 on the working surface 2 are not easily worn out, and the duration of the non-stick effect can be longer. Furthermore, the non-stick pan in the present embodiment does not use a chemical coating, can resist high-temperature dry burning, does not generate toxic and harmful substances, is not harmful to the human body, and is safer.

The above only describes specific embodiments of the present application, and the scope of protection of the present application is not limited thereto, and those skilled in the art should understand that the present application includes but is not limited to the content described in the drawings and the above specific embodiments. Any modifications that do not depart from the functional and structural principles of the present application are intended to be included within the scope of the claims.

What is claimed is:

1. A coatingless non-stick pan, comprising a pan body, wherein a side of the pan body facing away from a heat source upon operation is formed with a plurality of protrusions, and the side of the pan body facing away from the heat source upon operation is formed with a plurality of blind holes obtained by photo etching, a depth of the blind holes is less than 400 microns, a diameter of the blind holes is less than 300 microns, a protruding height of the protrusions is less than 500 microns, and a distance of the blind holes from the protrusions closest thereto is less than 50,000 microns.

2. The coatingless non-stick pan according to claim 1, wherein the depth of the blind holes is in a range between 1 and 400 microns, and the diameter of the blind holes is less than 100 microns.

3. The coatingless non-stick pan according to claim 1, wherein the plurality of protrusions (3) are radially distributed on a working surface (2) of the pan body.

4. The coatingless non-stick pan according to claim 1, wherein the plurality of protrusions are circumferentially distributed on a working surface of the pan body in multiple layers.

5. The coatingless non-stick pan according to claim 1, wherein the protruding height of the protrusions is in a range between 20 and 500 microns.

6. The coatingless non-stick pan according to claim 1, wherein the protrusions are ribs having a wire diameter in a range between 100 and 500 microns.

7. The coatingless non-stick pan according to claim 1, wherein the protrusions are a plurality of bosses which are arranged continuously.

8. The coatingless non-stick pan according to claim 1, wherein the blind holes are disposed in the protrusions.

9. The coatingless non-stick pan according to claim 1, wherein a ratio of an upper area of the protrusions to a cross-sectional area of the blind holes is in a range between 0.5 and 1.

10. The coatingless non-stick pan according to claim 1, wherein the pan body is made of titanium, stainless steel, iron, aluminum, aluminum alloy or magnesium.

* * * * *